(12) United States Patent
Nakamura et al.

(10) Patent No.: US 12,603,818 B2
(45) Date of Patent: Apr. 14, 2026

(54) CONTROL APPARATUS, CONTROL METHOD AND PROGRAM FOR ALLOCATING VIRTUAL NETWORKS FOR PROVIDING NETWORK SERVICES TO A PHYSICAL NETWORK

(71) Applicant: NTT, Inc., Tokyo (JP)

(72) Inventors: Ryota Nakamura, Tokyo (JP); Shigeaki Harada, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/683,393

(22) PCT Filed: Aug. 16, 2021

(86) PCT No.: PCT/JP2021/029925
§ 371 (c)(1),
(2) Date: Feb. 13, 2024

(87) PCT Pub. No.: WO2023/021555
PCT Pub. Date: Feb. 23, 2023

(65) Prior Publication Data
US 2025/0141752 A1 May 1, 2025

(51) Int. Cl.
*H04L 41/122* (2022.01)
*G06F 9/50* (2006.01)
*H04L 41/0895* (2022.01)

(52) U.S. Cl.
CPC .......... *H04L 41/122* (2022.05); *G06F 9/5077* (2013.01); *H04L 41/0895* (2022.05)

(58) Field of Classification Search
CPC .... G06F 9/5077; H04L 41/122; H04L 41/089
See application file for complete search history.

(56) References Cited

U.S. PATENT DOCUMENTS

| | | | |
|---|---|---|---|
| 2022/0094742 A1 | 3/2022 | Nakamura et al. | |
| 2022/0156661 A1* | 5/2022 | Xu ...................... | H04L 41/0826 |
| 2022/0300337 A1* | 9/2022 | Batra .................... | G06F 9/5055 |
| 2024/0354150 A1* | 10/2024 | Mani ..................... | G06F 9/5072 |

FOREIGN PATENT DOCUMENTS

JP 2020-127108 8/2020

* cited by examiner

*Primary Examiner* — Schquita D Goodwin
*Assistant Examiner* — Joseph M Cousins
(74) *Attorney, Agent, or Firm* — IPUSA, PLLC

(57) ABSTRACT

A network control device includes circuitry configured to narrow down virtual servers, to second virtual servers as candidates that are to be reallocated to nodes, based on changes in a cost for the nodes that are included in a physical network; and allocate a second virtual network of virtual networks, to the physical network, based on information related to the physical network.

7 Claims, 11 Drawing Sheets

Fig. 5

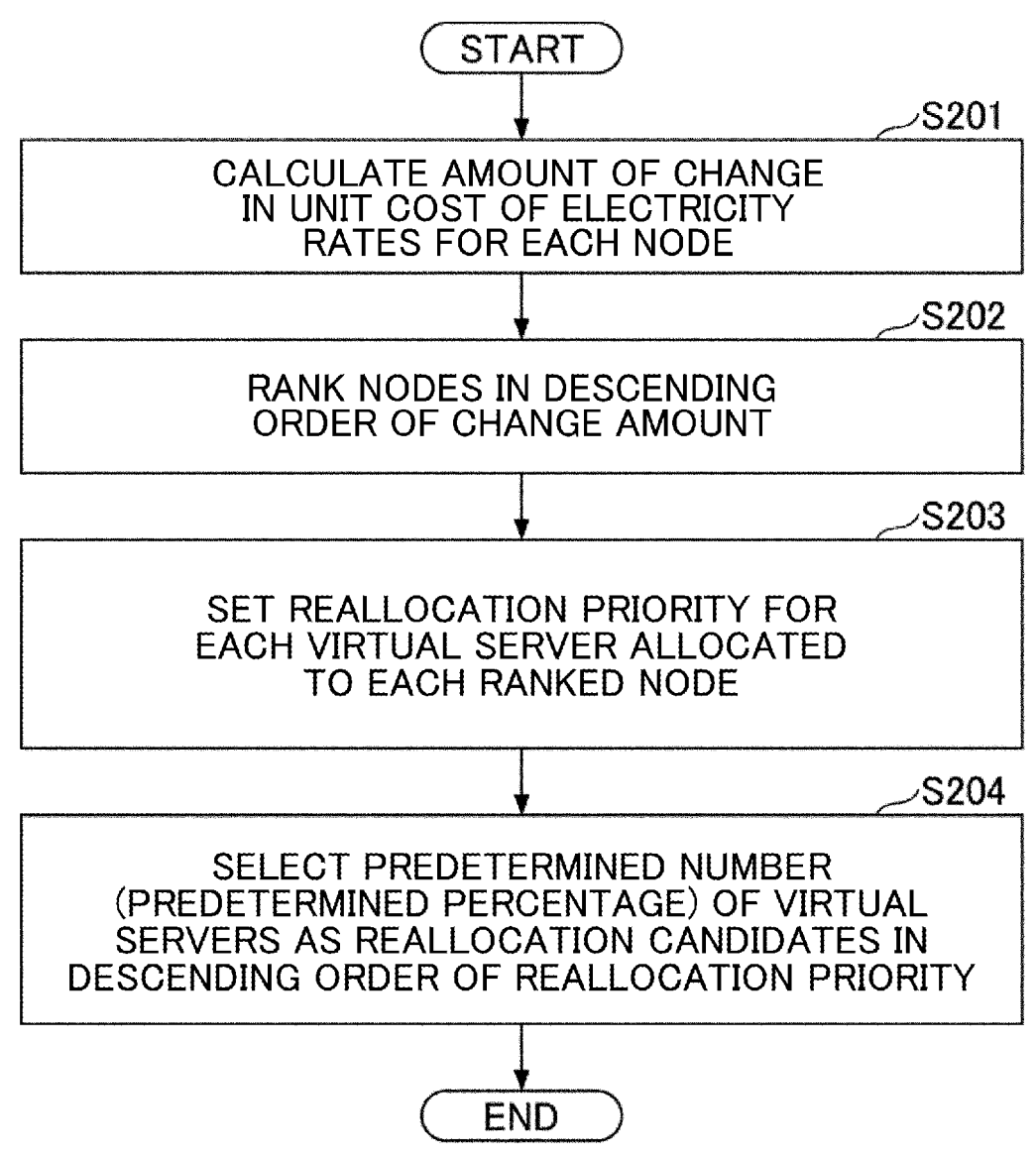

START

S201
CALCULATE AMOUNT OF CHANGE
IN UNIT COST OF ELECTRICITY
RATES FOR EACH NODE

S202
RANK NODES IN DESCENDING
ORDER OF CHANGE AMOUNT

S203
SET REALLOCATION PRIORITY FOR
EACH VIRTUAL SERVER ALLOCATED
TO EACH RANKED NODE

S204
SELECT PREDETERMINED NUMBER
(PREDETERMINED PERCENTAGE) OF VIRTUAL
SERVERS AS REALLOCATION CANDIDATES IN
DESCENDING ORDER OF REALLOCATION PRIORITY

END

TIME t

TIME t+1

AMOUNT OF CHANGE

Fig. 10

| VM | REALLOCATION PRIORITY |
|----|-----------------------|
| 1 | 3 |
| 2 | 4 |
| 3 | 1 |
| 4 | 1 |

CONTROL APPARATUS, CONTROL METHOD AND PROGRAM FOR ALLOCATING VIRTUAL NETWORKS FOR PROVIDING NETWORK SERVICES TO A PHYSICAL NETWORK

TECHNICAL FIELD

The present disclosure relates to a control apparatus, a control method, and a program.

BACKGROUND ART

A technique called NFV (Network Functions Virtualization) that enables provision of various network services by flexibly combining virtual network functions (VNFs) is known.

These network services are provided by allocating virtual networks (VNs), constructed by service providers, to physical resources that are held by telecommunications carriers. Specifically, these network services are provided by allocating the virtual network to each physical resource, under a condition in which requirements of each virtual network (for example, a start point and an end point of the virtual network, a required bandwidth, an allowed delay time, and the like), and resource constraints of a physical network (for example, a link bandwidth, server capacity, and the like) are satisfied. The virtual networks are constructed by virtual servers and virtual links.

Although an electricity rate is determined as a product of power consumption and a unit cost for the electricity rate, the unit cost for the electricity rate differs depending on an area (that is, a coverage area of each power company) and a time slot. For this reason, for example, even if a virtual network is allocated in a certain time slot such that the lowest electricity rate is obtained, the lowest electricity rate is not necessarily obtained in other time slots.

A method for optimizing the virtual network using a virtual-network optimization technique has been proposed so that the electricity rate is minimized when the unit cost for the electricity rate is changed (Patent Document 1).

CITATION LIST

Patent Document 1: Japanese Patent Application Publication No. 2020-127108

SUMMARY OF INVENTION

Problem to be Solved

However, in the case of the method disclosed in Patent Document 1, there is a problem in that computational complexity increases when the number of virtual servers and a topology scale of the physical network increase.

The present invention has been made in view of the above-mentioned point, and an object of the present invention is to reduce the burden of reallocating of virtual networks and to reduce an optimization calculation time, thereby allocating virtual servers with a low cost.

Means for Solving the Problem

In order to achieve the above object, a control apparatus according to an embodiment of the present invention is a control apparatus that allocates virtual networks for providing network services to a physical network, the control apparatus including: acquisition means for acquiring information related to the physical network; reallocation candidate narrowing means for narrowing down to predetermined virtual servers, which are reallocation candidates, among virtual servers allocated to each node based on an amount of change in a unit cost of electricity rates for each node that constructs the physical network; and allocation means for allocating the virtual network including a specific server among the predetermined virtual servers narrowed down by the reallocation candidate narrowing means to the physical network, based on the information related to the physical network acquired by the acquisition means.

Advantageous Effects of Invention

As described above, according to the present invention, it is possible to reduce the burden of reallocating virtual networks and to reduce an optimization calculation time, thereby allocating virtual servers with a low cost.

BRIEF DESCRIPTION OF DRAWINGS

FIG. 5 is a flowchart showing a process of refining reallocation of candidates.

FIG. 10 is a diagram showing a recalculation priority for each virtual server (VM).

DESCRIPTION OF EMBODIMENTS

First Embodiment

A first embodiment of the present invention will be described below in detail with reference to the drawings. In an embodiment of the present invention, a case will be described in which an electricity rate is taken as an example of a cost, and when virtual networks (virtual servers and virtual links) are allocated to physical resources, the allocation of the virtual network is performed such that the electricity rate is minimized, in consideration of the outside temperature, a load rate, a time slot, and an area (coverage area of each power company).

In view of this, in the embodiment of the present invention, power consumption models in which the outside temperature (in accordance with a higher the temperature, increased power is consumed for cooling) and the load rate (as the server is busier, increased power is consumed) are taken into consideration (a power consumption model of a data center and a power consumption model of a link) are defined, and a target function is formulated in which a total cost (that is, the electricity rate) is calculated by multiplying a unit cost for the electricity rate taking into consideration the time slot, by the power consumption that is calculated using these power consumption models. Then, the allocating of the virtual networks is performed such that the target function is minimized. Note that the allocating of the virtual networks to the physical resources may also be performed as, for example, "embedding a given virtual network in a physical resource", "arranging the virtual network in a physical resource", or the like.

<Relationship Between Physical Network 200 and Coverage Areas of Power Companies>

Figure 1:
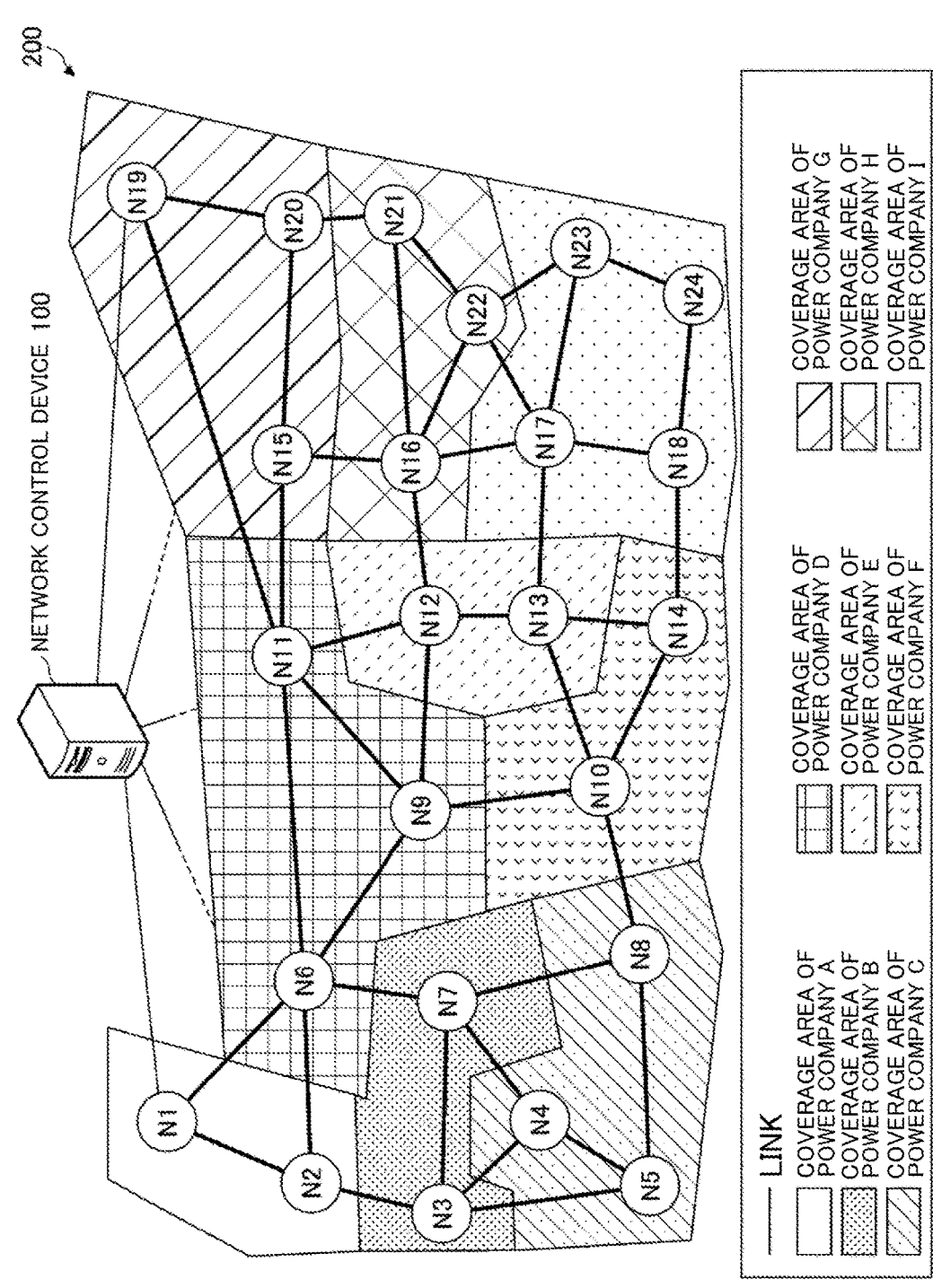
FIG. 1 is a diagram for illustrating an example of the relationship between physical networks and coverage areas of power companies.

First, the relationship between the physical network 200 and coverage areas of power companies will be described with reference to FIG. 1. FIG. 1 is a diagram for illustrating an example of the relationship between the physical network 200 and the coverage areas of the power companies.

As shown in FIG. 1, the physical network 200 is constructed by a network control device 100, nodes N1 to N24, and links connecting the nodes. In addition, the coverage areas for power company A to power company I are shown in FIG. 1. Note that the nodes N1 to N24 are, for example, data centers in which servers, various communication devices, and the like are arranged. Hereinafter, the nodes N1 to N24 of the physical network 200 will also be described as data centers.

Here, for example, assuming that all power companies have the same unit cost for electricity rates, when a node N8 in which a user terminal is installed accesses a node 16 in which a service server, providing network services, is installed, an optimal route shows a case of node N8→node N10→node 13→node N12→node N16. However, if, for example, the unit cost for the electricity rate for a power company E, which has covers nodes N12 and N13, is higher than that of each of the other power companies, it can be expected that a route bypassing the coverage area of a power company E, such as a case of a node N8→a node N10→a node N14→a node N18→a node N17→a node N16, is an optimal route. Also, when a certain service server provides a network service, in the case of FIG. 1, it is preferable to place virtual servers in the node N12 or the node N13, in consideration of centrality (that is, a position where the sum of distances to all destinations at which services are provided is small). However, it is expected that placing the virtual servers in the node N18 or the node N17 will provide cost advantages, in view of the fact that electricity rates on the rise.

In this way, since the unit cost for electricity rates differs depending on the area, the network control device 100 changes an allocation pattern of optimal virtual networks (that is, the allocation pattern adopted when the allocating of the virtual networks to the physical resources is performed) in consideration of the electricity rate. Further, as will be described later, the unit cost for electricity rates differs depending on the time slot, and thus the network control device 100 changes the allocation pattern of optimal virtual networks, depending on the time slot.

<Relationship Between Time Slot and Unit Cost for Electricity Rates>

Figure 2:
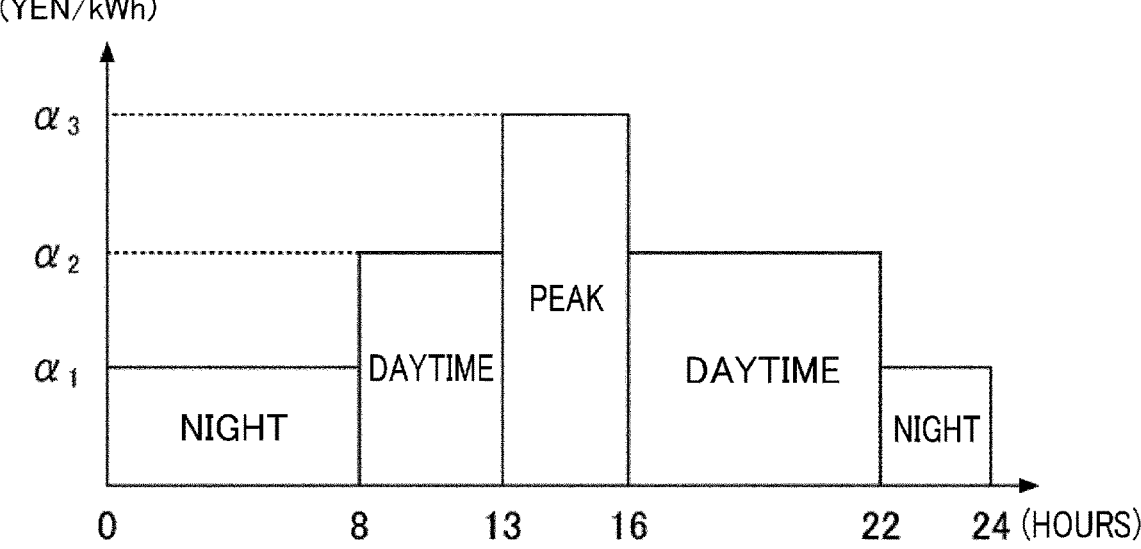
FIG. 2 is a diagram for illustrating an example of the relationship between a time slot and a unit cost for an electricity rate.

Here, the relationship between the time slot and the unit cost for the electricity rate will be described with reference to FIG. 2. FIG. 2 is a diagram for illustrating an example of the relationship between the time slot and the unit cost for the electricity rate.

FIG. 2 shows an example of the unit cost for the electricity rate for a certain power company. As shown in FIG. 2, in general, the unit cost for the electricity rate differs depending on the time slot. In the example shown in FIG. 2, in night time slots (0:00 to 8:00, and 22:00 to 24:00), the unit cost for the electricity rate is $\alpha_1$. In day time slots (8:00 to 13:00, and 16:00 to 22:00), the unit cost for the electricity rate is $\alpha_2$. In a peak time slot (13:00 to 16:00), the unit cost for the electricity rate is $\alpha_3$.

As illustrated above, unit costs for electricity rates generally differs according to time slots. However, the example shown in FIG. 2 is for illustrative purposes. Depending on a power company, unit costs for electricity rates may be fixed regardless of the time slot. Many time slots may be also adopted compared to the example shown in FIG. 2.

<Formulation of Target Function>

Next, in the physical network 200 for which the unit cost for the electricity rate differs depending on an area (coverage area of power company) and the time slot, the network control device 100 formulates a target function for determining allocation of virtual networks such that the lowest electricity rate is obtained.

First, a power consumption model $P_{DCi}$ of an i-th data center and a power consumption model $P_{Linkj}$ of a j-th link are defined by functions f and g, expressed by the following formulas (1) and (2).

[Math. 1]

$$P_{DCi} = f_i(t_i, l_i) \tag{1}$$

[Math. 2]

$$P_{Linkj} = g_j(t_j, b_j) \tag{2}$$

Here, $t_i$ indicates the outside temperature (° C.) at the location of the i-th data center, $l_i$ indicates the overall load rate (%) of the i-th data center, $t_j$ indicates the outside temperature (° C.) at the location of the j-th link, and $b_j$ indicates the load rate of the j-th link.

It is assumed that the outside temperature and the power consumption have an exponential relationship. Also, even if the load rate is zero, idle power, standby power, power for an air conditioner for continuously cooling the server, and the like are needed, and therefore the power consumption is not zero. In consideration of the situation, the following formula (3) is given as an example of the power consumption model $P_{DCi}$ of the data center.

[Math. 3]

$$P_{DCi} = e^{D_i(t_i-20)} \times \left[ f_i(20,0) + \{f_i(20,100) - f_i(20,0)\} \times l_i/100 \right] \tag{3}$$

Here, e is the base of a natural logarithm, $D_i$ is a constant that is determined in advance for each data center, $f_i(20, 0)$ indicates the power consumption of the i-th data center when the outside temperature is 20° C. and the load rate is 0%, and $f_i(20, 100)$ indicates the power consumption of the i-th data center when the outside temperature is 20° C. and the load rate is 100%.

The following formula (4) is also given as an example of the power consumption model $P_{Linkj}$ of the virtual link.

[Math. 4]

$$P_{Linkj} = e^{D_j(t_j-20)} \times \left[ g_i(20,0) + \{g_i(20,100) - g_j(20,0)\} \times b_i/100 \right] \quad (4)$$

Here, $g_j(20, 0)$ indicates the power consumption of the j-th virtual link when the outside temperature is 20° C. and the load rate is 0%, and $g_j(20, 100)$ indicates the power consumption of the j-th virtual link when the outside temperature is 20° C. and the load rate is 100%.

The constants $D_i$ and $D_j$ of Formulas (3) and (4) need only be derived using regression analysis or the like, based on, for example, actual measured data of the power consumption, the load rate, and the outside temperature.

Next, a CPU (Central Processing Unit) demand that is needed in the a-th virtual network is defined as $C_{VNa}$, the CPU processing capacity of the i-th data center is defined as $C_{imax}$, and the j-th virtual link bandwidth is defined as $C_{jmax}$. In this case, $l_i$ and $b_j$ can be expressed using the following formulas (5) and (6).

[Math. 5]

$$l_i = \frac{\sum_{a \in i} C_{VNa}}{C_{imax}} \quad (5)$$

[Math. 6]

$$b_j = \frac{\sum_{a \in j} C_{VNa}}{C_{jmax}} \quad (6)$$

The numerator on the right side of Formula (5) above indicates a total CPU demand for all virtual networks that are allocated to the i-th data center. Similarly, the numerator on the right side of Formula (6) indicates the bandwidth of all of the virtual networks that are allocated to the j-th link.

Also, the virtual network cannot be allocated to exceed the CPU processing capacity of each data center and the link bandwidth of each virtual link, and thus the constraints shown in formula (7) and formula (8) below are obtained.

[Math. 7]

$$\sum_{a \in i} \overline{C_{VNa}} \leqq C_{imax} \quad (7)$$

[Math. 8]

$$\sum_{a \in j} C_{VNa} \leqq C_{jmax} \quad (8)$$

As described above, it is possible to formulate a target function h shown in the following formula (9).

[Math. 9]

$$h = \sum P_{DCi} \times F_{Ti} + \sum P_{Linkj} \times F_{Tj} \quad (9)$$

Here, $F_{Ti}$ represents the unit cost for the electricity rate at the i-th data center at time T, and $F_{Tj}$ represents the unit cost for the electricity rate at the j-th link at time T. In addition, the first term of the target function h shown in Formula (9) above indicates electricity rates for all of the data centers that are located on a route (that is, the route connecting the start point and the end point of a virtual network), and the second term indicates electricity rates for all of the links on the route.

Accordingly, the constraints shown in Formula (7) and Formula (8) above are satisfied, and it is possible to realize the allocation of virtual networks that minimizes the cost (that is, the electricity rate) by using a virtual-network allocation pattern (that is, the route connecting the start point and the end point of each virtual network) that minimizes the target function h shown in Formula (9) above. Note that, for example, in a case of service function chaining in which a firewall (FW), an intrusion detection system (IDS), and the like are arranged partway along the route, it is possible to determine which data center has a function such as the FW or the IDS, as well as determining any route.

Note that the constraints shown in Formulas (7) and (8) above include the CPU processing capacities of the data centers and the link bandwidths of the links, but other than the above constraints, it is also considered that the following constraints are also used according to a required quality and the like of each of the network services to be provided by the virtual network.

Not exceeding the line capacity of each link
Delay time not exceeding a determined upper limit
Each virtual network being allocated to one physical machine (that is, virtual networks being inseparable)
Not exceeding a contract electrical power for each data center Here, although the target function h shown in Formula (9) can be applied in the case of a normal state in which the load rate and the outside temperature do not change (that is, a case in which $t_i$, $l_i$, and $b_j$ are constants), the target function h can be applied in the case where $t_i$, $l_i$, and $b_j$ change over time (that is, a case in which $t_i$, $l_i$, and $b_j$ are variables). By setting $t_i$, $l_i$, and $b_j$ as the variables, the optimal virtual-network allocation pattern for each time slot can be determined in consideration to a temporal change in all of the outside temperature, the load rate (that is, traffic amount), and the unit cost for electricity rates. Note that, for example, data acquired from a weather information service or the like can be used as the outside temperature $t_i$, and the load rates $l_i$ and $b_j$ can be calculated based on traffic amounts that are obtained by performing prediction using a known traffic prediction technique. The traffic prediction technique is, for example, a technique of predicting a future traffic amount based on a past traffic amount using a method such as machine learning. Here, as the prediction method, for example, any method can be applied as long as it is a chronological prediction method, such as the ARIMA model, or LSTM (Long Short-Term Memory). For ARIMA models, a method disclosed, for example, in "Feng Huifang, and Yantai Shu. "Study on network traffic prediction techniques", Wireless Communications, Networking and Mobile Computing, 2005. Proceedings. 2005 International Conference. Vol. 2. IEEE, 2005" and the like can be used. As for LSTM, for example, a method disclosed, for example, in "Hochreiter, Sepp, and Jurgen Schmidhuber. "Long short-term memory.", Neural computation 9.8 (1997): 1735-1780" or the like can be used.

Hereinafter, the network control device 100 will be described in which optimal allocation of the virtual networks is realized by determining the virtual-network allocation pattern that minimizes the target function h shown in Formula (9) above while the constraints shown in Formulas (7) and (8) above are satisfied.

<Functional Configuration of Network Control Device 100>

Figure 3:
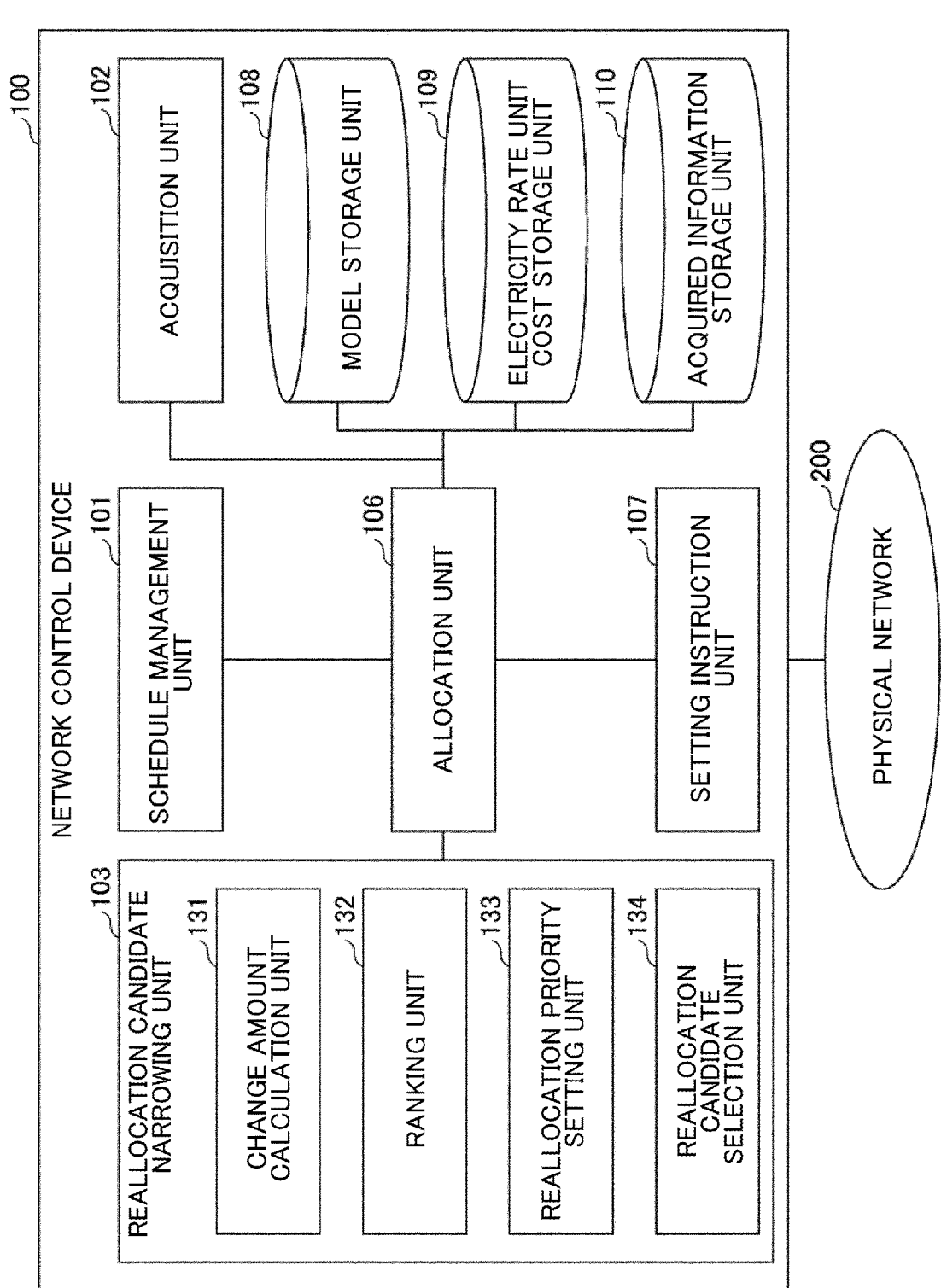
FIG. 3 is a diagram showing an example of a functional configuration of a network control apparatus according to an embodiment of the present invention.

Next, the functional configuration of the network control device 100 according to the embodiment of the present invention will be described with reference to FIG. 3. FIG. 3 is a diagram showing an example of the functional configuration of the network control device 100 according to the embodiment of the present invention.

As shown in FIG. 3, the network control device 100 according to the embodiment of the present invention includes a schedule management unit 101, an acquisition unit 102, a reallocation candidate narrowing unit 103, an allocation unit 106, and a setting instruction unit 107 as functional units implemented according to the instructions of a processor 304 shown in FIG. 11 described later. Further, the network control device 100 according to the embodiment of the present invention includes a model storage unit 108, an electricity rate-unit cost storage unit 109, and an acquired information storage unit 110 as storage units configured by at least one of a RAM 302 and an auxiliary storage device 306 shown in FIG. 11 described later.

The model storage unit 108 stores power consumption models (that is, the power consumption models shown in Formulas (1) and (2) above). The electricity rate-unit cost storage unit 109 stores the unit cost of electricity rates for each time slot and in each area. Note that the unit cost of electricity rates is updated each time the unit cost of electricity rates is changed, such as a revised unit cost of electricity rates for a given power company, a contract change with the power company, a change to the other power company, or the like, for example. The acquired information storage unit 110 stores various kinds of information acquired by acquisition unit 102.

The schedule management unit 101 manages a schedule (that is, an execution condition for allocation of virtual networks) of executing processing (process of allocating the virtual networks) for determining the allocation pattern of optimal virtual networks and allocating the virtual networks in the allocation pattern to physical resources. Here, examples of the execution condition of for allocation of virtual networks include "elapse of a predetermined time interval from a timing at which the allocation is previously performed," and "a case where a traffic amount is increased to be greater than or equal to a certain threshold value."

Next, the acquisition unit 102 acquires information related to the physical network and information related to a request to allocate the virtual networks.

The information related to the physical network includes at least one of information indicating the outside temperature of each node included in the physical network, information indicating a predicted traffic amount of the physical network, and physical resource information of the physical network.

The information indicating the outside temperature of each node included in the physical network is information indicating the outside temperature at the location of each data center (hereinafter also referred to as "outside temperature information"). Here, the acquisition unit 102 may acquire the outside temperature information from, for example, a weather information service or the like, or if an outside temperature sensor or the like is installed in each data center, the outside temperature information may be acquired from the outside temperature sensor.

The information indicating the predicted traffic amount of the physical network is information indicating the traffic amount (that is, the predicted traffic amount) at the time when the allocating of one or more virtual networks is performed. This kind of traffic amount is predicted using a traffic prediction technique, as described above. Note that the acquisition unit 102 may also acquire a traffic amount predicted using another device that is connected via the network control device 100 and a network, and may also acquire a traffic amount predicted by the network control device 100.

Furthermore, the physical resource information of the physical network is information indicating, for example, the processing capacity of the CPU of each data center, the link bandwidth of each link, and the like.

On the other hand, the information related to the request to allocate the virtual networks is information indicating the request to the virtual networks from the service provider that provides the network service. Such an allocation request includes virtual network requirements (for example, a start point and an end point of a given virtual network, a required bandwidth, allowable delay, and the like).

Next, the reallocation candidate narrowing unit 103 narrows the servers down to predetermined virtual servers, which are reallocation candidates, among the virtual servers allocated to the nodes, based on changes in the unit cost of the electricity rate for each node that constructs part of the physical network.

Here, the reallocation candidate narrowing unit 103 will be described in detail. The reallocation candidate narrowing unit 103 includes a change amount calculation unit 131, a ranking unit 132, a reallocation priority setting unit 133, and a reallocation candidate selection unit 134.

Among these units, the change amount calculation unit 131 calculates the amount of change in the unit cost of the electricity rate for each node constructing part of the physical network, based on the information indicating the electricity rate for each time slot in each area stored in the electricity rate-unit cost storage unit 109. The ranking unit 132 ranks the nodes in descending order of the changes calculated by the change amount calculation unit 131. The reallocation priority setting unit 133 sets the reallocation priority of each virtual server that is allocated to each node, based on the rank given by the ranking unit 132. The reallocation candidate selection unit 134 selects predetermined virtual servers as reallocation candidates in descending order of the reallocation priority set by the reallocation priority setting unit 133. The predetermined virtual servers are a predetermined number or a predetermined percentage of virtual servers that are reallocation candidates among virtual servers.

Next, the allocation unit 106 allocates a virtual network including a specific server to which the reallocation candidate narrowing unit 103 narrows down the predetermined virtual servers, to the physical network, based on the information related to the physical network acquired by the acquisition unit 102. More specifically, the virtual network including the specific server among the predetermined virtual servers, selected by the reallocation candidate selection unit 134, is allocated to the physical network based on the information related to the physical network acquired by the allocation unit 106 and the acquisition unit 102.

Further, according to the instruction from the schedule management unit 101, the allocation unit 106 calculates an optimal allocation pattern of the virtual networks including the specific server to the physical network using the target function h shown in formula (9). That is, the allocation unit 106 first creates restrictive conditions using a service request (here, a virtual network allocation request) and information on physical resources. Then, the allocation unit 106 calculates the optimal virtual network allocation pattern using the power consumption models, the unit cost of the electricity rate for each area and each time slot, the outside temperature, and the load rates. Note that the load rate is calculated based on, for example, a predicted traffic amount and a CPU processing capacity (or link bandwidth).

The setting instruction unit 107 transmits a virtual network setting instruction to each physical resource (for example, a server, various communication devices, and the like) so as to realize the optimal virtual network allocation pattern calculated by the allocation unit 106. Accordingly, the optimal virtual network allocation is realized.

<Processing or Operation of Present Embodiment>

Figure 4:
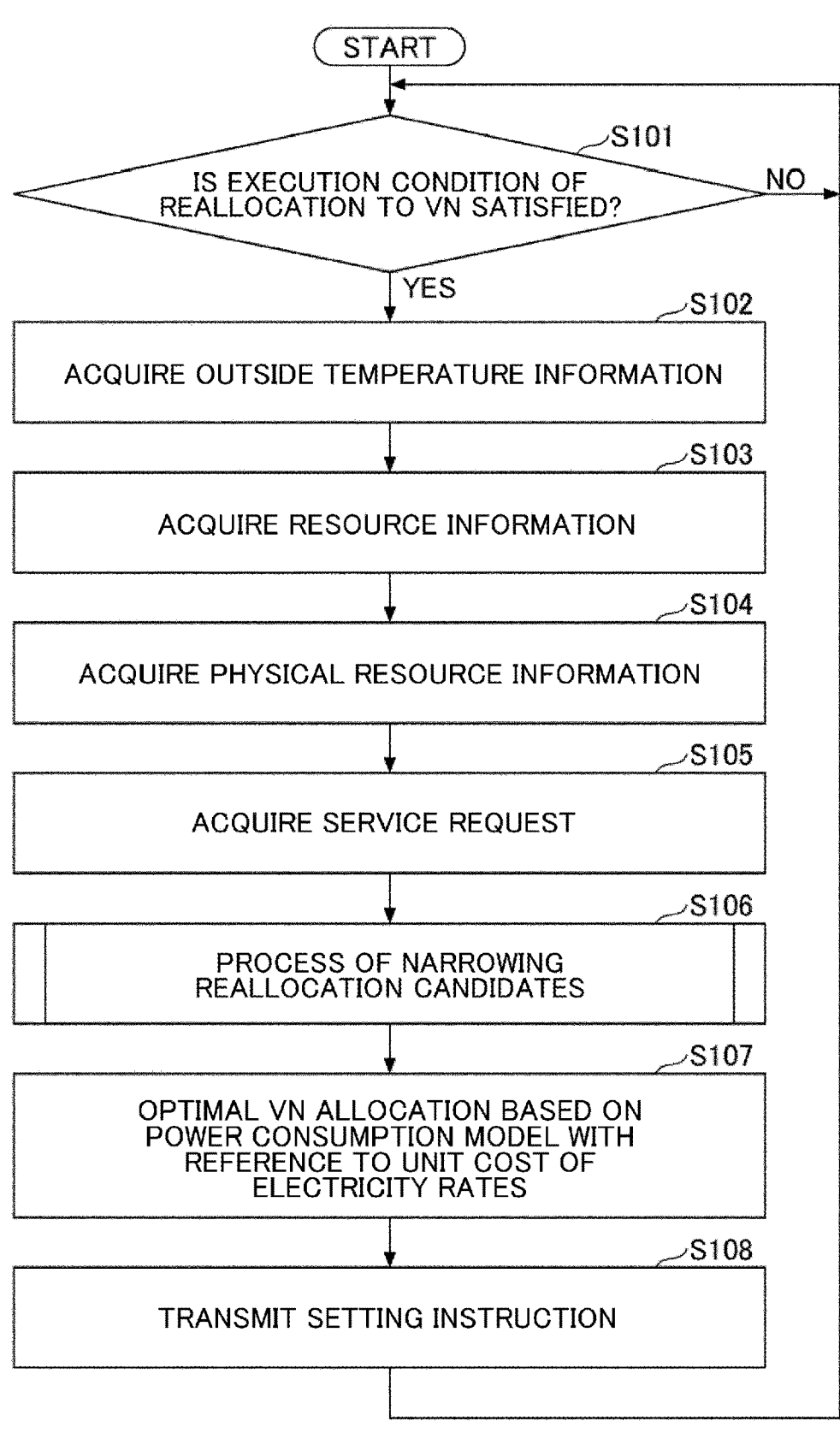
FIG. 4 is a flowchart showing an example of a process of allocating virtual networks according to the embodiment of the present invention.

Next, virtual network (virtual server and virtual link) allocation processing according to the embodiment of the present invention will be described with reference to FIGS. 4 to 10. FIG. 4 is a flowchart showing an example of virtual network allocation processing according to the embodiment of the present invention.

Step S101: First, the schedule management unit 101 determines whether the execution condition of allocation of the virtual networks is satisfied. As described above, examples of the execution condition of allocation of the virtual networks include "elapse of a predetermined time interval from a timing at which the allocation is previously performed", and "a case where a traffic amount is increased to be greater than or equal to a certain threshold value". If it is determined that the execution condition of allocation of the virtual networks is satisfied, the processing proceeds to step S102.

Here, for example, if the execution condition of allocation of the virtual networks is set to include "the case where a traffic amount is increased to be greater than or equal to a certain threshold value," a one-day operation plan (that is, a plan of how to perform virtual network allocation) is formulated based on the traffic amount predicted using the traffic prediction technique, and if an unexpected increase in traffic that exceeds a certain predetermined threshold value occurs, virtual network allocation can be performed.

Note that, for example, if "elapse of a predetermined time interval from a timing at which the allocation is previously performed" is set as the execution condition of allocation of the virtual networks, electricity rates are generally added every 30 minutes in many cases, and therefore it is considered that the predetermined time interval (this time interval is also referred to as a "control interval") is set to 30 minutes.

On the other hand, if the control interval is set to 30 minutes or more, the unit cost of the electricity rate changes during a control interval in some cases. In view of this, in such a case, a time average for unit costs of electricity rates need only be used with the target function h shown in Formula (9) above. For example, if the unit cost of the electricity rate changes during a control interval from $T_1$ to $T_2$, the time average-unit cost $F_{avr\,k}$ at the k-th data center (or link) need only be defined as expressed in Formula (10) below, and $F_{avr\,i}$ and $F_{avr\,j}$ need only be used instead of $F_{Ti}$ and $F_{Tj}$ in the target function h shown in Formula (9) above.

[Math. 10]

$$F_{avrk} = \frac{1}{T_2 - T_1} \int_{T_1}^{T_2} F_{Tk} dT \qquad (10)$$

Accordingly, even if the unit cost of the electricity rate changes during a control interval from $T_1$ to $T_2$, it is possible to calculate the optimal allocation pattern of the virtual networks with high accuracy.

Step S102: The acquisition unit 102 acquires outside temperature information indicating the outside temperature at the location of each data center and stores it in the acquired information storage unit 110.

Step S103: The acquisition unit 102 acquires the predicted traffic amount during the time period in which the allocating of the virtual networks is performed, and stores it in the acquired information storage unit 110.

Step S104: The acquisition unit 102 acquires information related to physical resources and stores it in the acquired information storage unit 10.

Step S105: The acquisition unit 102 acquires information indicating a service request (request to allocate the virtual networks) and stores it in the acquired information storage unit 10.

Note that steps S102 to S105 are performed in a random order.

Step S106: The reallocation candidate narrowing unit 103 narrows down servers to predetermined virtual servers, which are reallocation candidates, among the virtual servers allocated to the nodes, based on the amount of change in the unit cost of the electricity rate for each node that constructs the physical network.

(Reallocation Candidate Narrowing Process)

Figure 6:
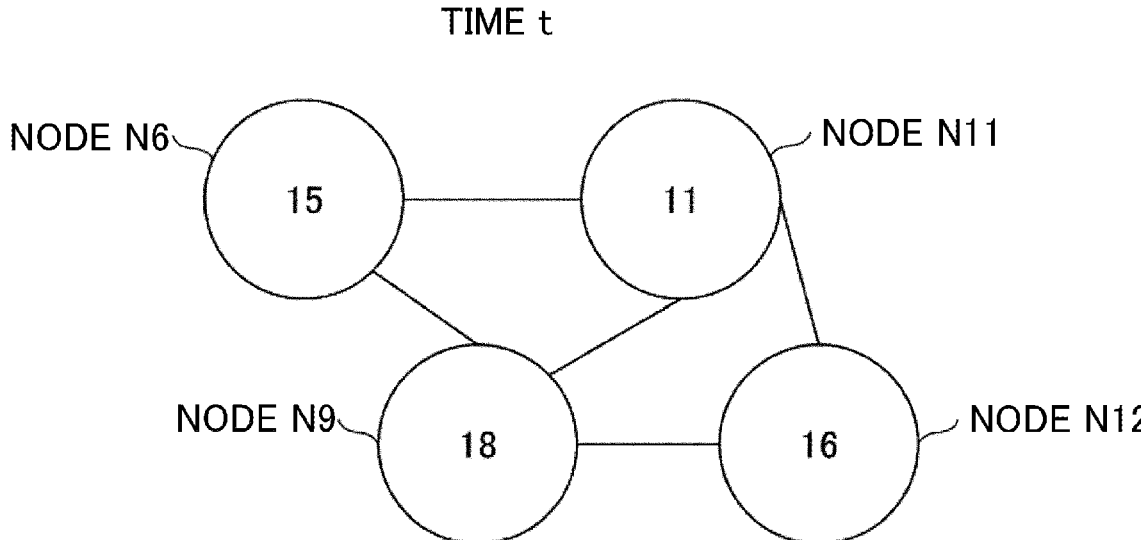
FIG. 6 is a diagram showing an electricity rate at each node at time t.
Figure 7:
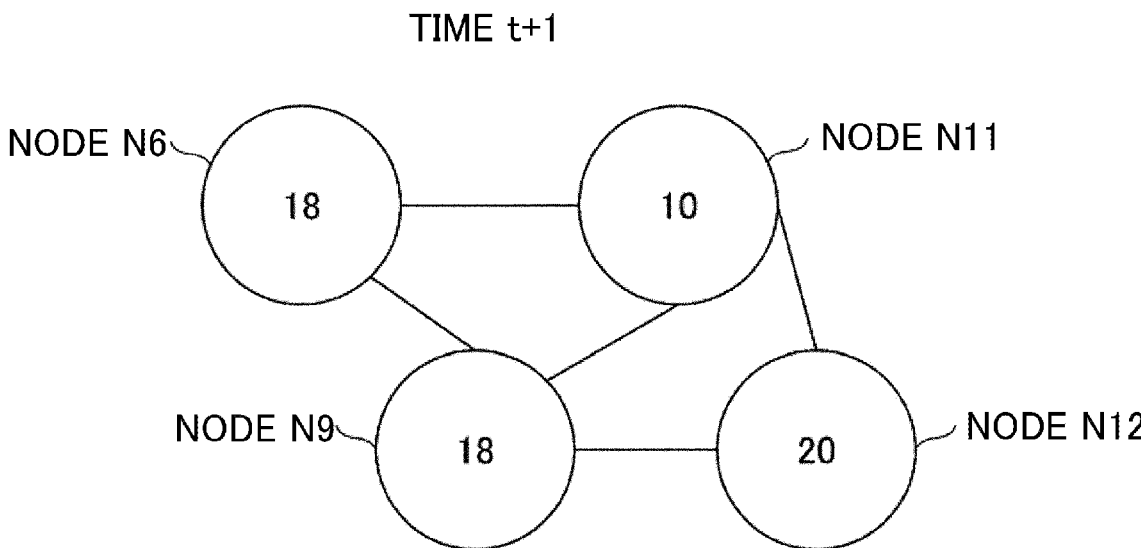
FIG. 7 is a diagram showing the electricity rate at each node at time t+1.
Figure 8:
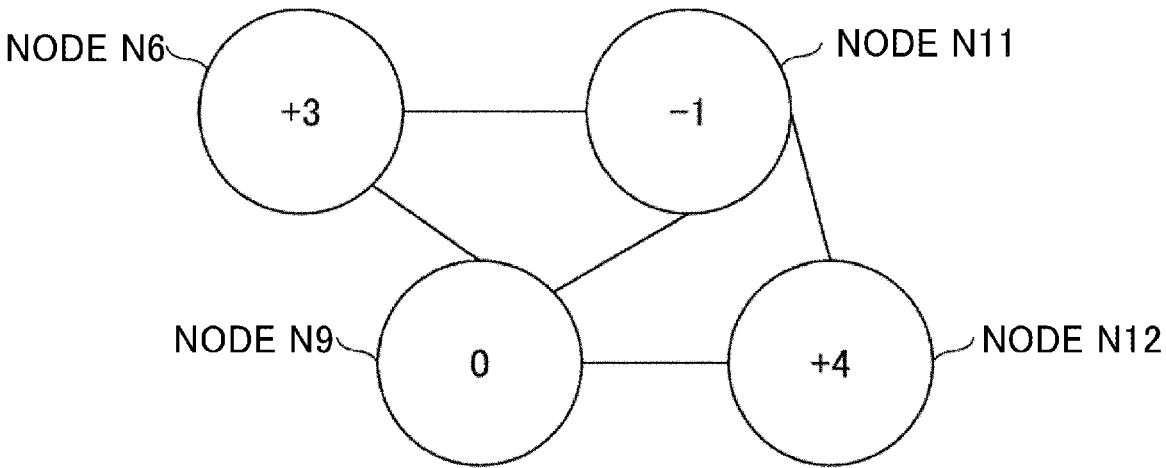
FIG. 8 is a diagram showing changes in the electricity rate at each node.
Figure 9:
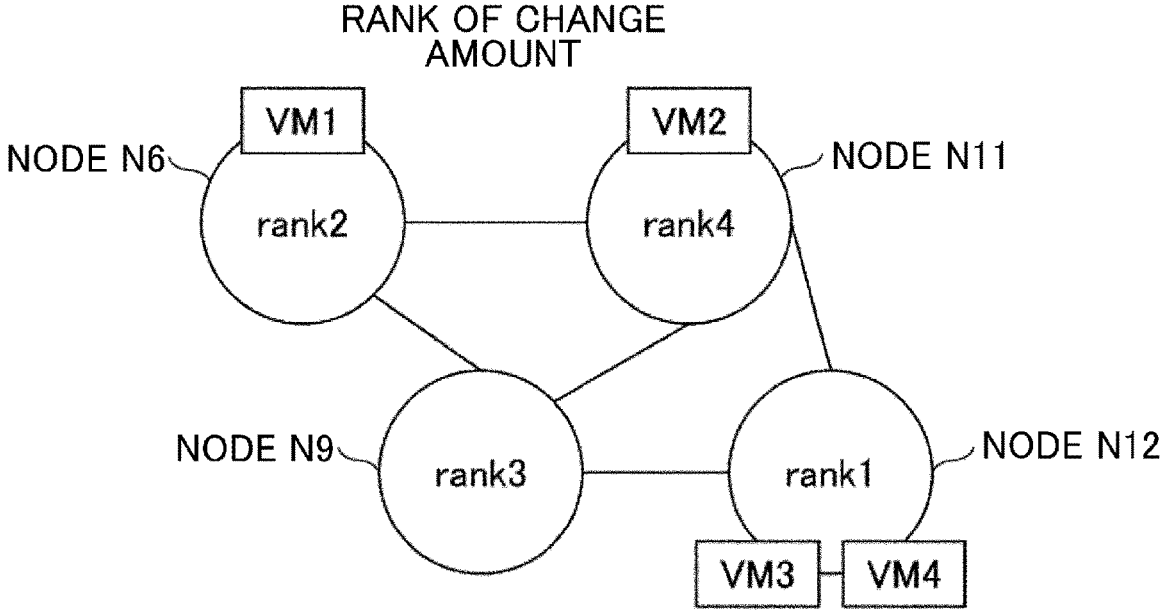
FIG. 9 is a diagram showing ranks for changes at each node.

Here, the process of narrowing reallocation candidates will be described in detail with reference to FIG. 5. FIG. 5 is a flowchart showing the process of narrowing reallocation candidates. FIG. 6 is a diagram showing the electricity rate for each node at time t. FIG. 7 is a diagram showing the electricity rate for each node at time t+1. FIG. 8 is a diagram showing changes in the electricity rate at each node. FIG. 9 is a diagram showing the rank of the changes for each node. FIG. 10 is a diagram showing reallocation priority of each virtual server (VM). FIGS. 6 to 8 show four nodes N6, N9, N11 and N12 as an example.

Step S201: First, the change amount calculation unit 131 calculates the changes in the unit cost of the electricity rate for each node. Specifically, the change amount calculation unit 131 reads information indicating the electricity rate for each node at time t from the electricity rate-unit cost storage unit 109. As shown in FIG. 6, at time t, the unit cost of the electricity rate for the node N6 is "15", the unit cost of the electricity rate for the node N9 is "18", the unit cost of the electricity rate for the node N11 is "11", and the unit cost of the electricity rate for the node N12 is "12."

Then, the change amount calculation unit 131 reads information indicating the electricity rate for each node at time t+1, from the electricity rate-unit cost storage unit 109. As shown in FIG. 7, at time t+1, the unit cost of the electricity rate for the node N6 is "18", the unit cost of the electricity rate for the node N9 is "18", the unit cost of the electricity rate for the node N11 is "10", and the unit cost of the electricity rate for the node N12 is "20."

Furthermore, the change amount calculation unit 131 calculates the changes in the unit cost of the electricity rate at time t+1, from the unit cost of the electricity rate at time t. As shown in FIG. 8, the changes in the unit cost of the electricity rate for the node N6 is "+3", the changes in the unit cost of the electricity rate for the node N9 is "0", and the changes in the unit cost of the electricity rate for the node N11 is "−1", and the changes in the unit cost of the electricity rate for the node N12 is "+4."

Step S202: Next, the ranking unit 132 ranks the nodes in descending order of the changes. Specifically, as shown in FIG. 9, the rank for the node N6 is "2", the rank for the node N9 is "3", the rank for the node N11 is "4", and the rank for the node N12 is "1."

Step S203: The reallocation priority setting unit 133 sets the reallocation priority of each virtual server that is allocated to the ranked node. At this time, the reallocation priority setting unit 133 sets the reallocation priority of each virtual server in descending order of ranks for the allocation nodes. Specifically, as shown in FIGS. 9 and 10, the recalculation priority for a virtual server VM1 is "3", the recalculation priority for a virtual server VM2 is "4", and the recalculation priority of virtual servers VM3 and VM4 is "1". Note that, as shown in FIG. 9, since virtual servers are already allocated to nodes so that the virtual server VM1 is allocated to the node N6, the reallocation priority setting unit 133 sets the reallocation priority of virtual servers rather than the reallocation priority of nodes.

Step S204: The reallocation candidate selection unit 134 selects predetermined virtual servers as reallocation candidates in descending order of reallocation priority.

In addition, the predetermined number of virtual servers as reallocation candidates may be selected with a specific number, such as a case where selecting of two virtual servers is performed in advance, or may be selected with a predetermined percentage of the whole such as the top 25% of recalculation priority among all virtual servers.

Thus, the process of narrowing reallocation candidates is completed. In this way, since the reallocation candidate narrowing unit 103 narrows down the reallocation candidates again before step S107 described later is executed, it is possible to reduce the burden of changing the settings of the virtual network, reduce a time period in which an optimization calculation is performed, and performing allocation to virtual servers for which low electricity rates are obtained.

Step S107: Next, the allocation unit 106 creates constraints, using the request to allocate the virtual networks and information on physical resources. Then, the allocation unit 106 calculates the optimal allocation pattern of the virtual networks, using the power consumption models, the unit cost of the electricity rate for each time slot in each area, the outside temperature, and the load rates.

Step S108: Next, the setting instruction unit 107 transmits information indicating a virtual network setting instruction to each physical resource so as to realize the optimal allocation pattern of the virtual networks, determined in step S107 above.

Note that steps S101 to S105, S107, and S108 described above may be executed by other methods.

<Main Effects of Present Embodiment>

As described above, according to the embodiment of the present invention, the concept of the virtual server, which is highly effective in performing recalculation and resetting from the viewpoint of minimizing the electricity rate, is used. When the unit cost of electricity rates of each link and node changes, the network control device 100 does not recalculate and rearrange the entire virtual network, but narrows down to predetermined virtual servers (groups) for recalculating the load arrangement by referring to the amount of change in each unit cost of electricity rates and applies optimization calculation only to the narrowed-down predetermined virtual servers (groups). As a result, it is possible to reduce the load of changing the virtual network allocation, reduce the optimization calculation time, and achieve virtual server load arrangement with low electricity rates.

Moreover, the effect of eliminating the problem of resetting the entire virtual network can be obtained every time the unit cost of electricity rates changes, which could otherwise lead to network instability.

Furthermore, it is possible to realize virtual network allocation that minimizes an electricity rate, with consideration given also to the outside temperature, a load rate, a time slot, an area, and the like. Accordingly, using the network control device 100 according to the embodiment of the present invention, for example, a telecommunications carrier can further reduce the OPEX.

Note that although the electricity rate was used as an example of cost in the embodiment of the present invention, there is no limitation thereto, and the present invention can be applied similarly as long as a target function is used which is derived by multiplying the power consumption and a variable that can change for each area at each time, similarly to the unit cost of the electricity rate.

For example, the amount of $CO_2$ emission is an example of another cost. This is because although the amount of $CO_2$ emissions is calculated as the product of power consumption and the $CO_2$ emission factor, the $CO_2$ emission factor has a value that differs for each power company, and has an area difference, as in the unit cost of the electricity rate. Although $CO_2$ emission factors are generally fixed values that do not change over time, due to the growing need to reduce environmental load and the fact that different power generation facilities operate depending on the time slot, it is conceivable that $CO_2$ emission factors will be defined for each time slot in the future. In that case, it is thought that the application of the present invention will enable the minimization of $CO_2$ emissions and the provision of services that appeal to the reduction of environmental load.

<Hardware Configuration of Network Control Device 100>

Finally, a hardware configuration of the network control device 100 according to the embodiment of the present invention will be described with reference to FIG. 11. FIG. 11 is a diagram showing an example of the hardware configuration of the network control device 100 according to the embodiment of the present invention.

Figure 11:
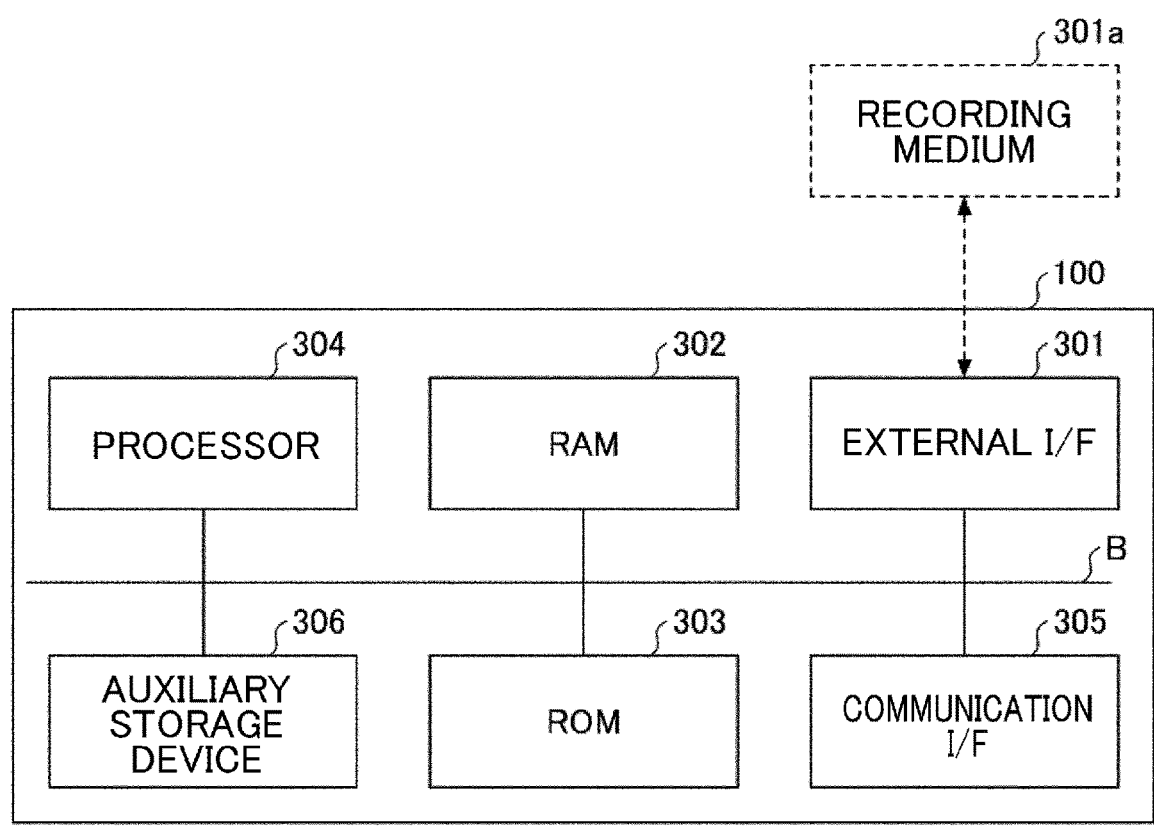
FIG. 11 is a diagram showing an example of a hardware configuration of a network control apparatus according to the embodiment of the present invention.

As shown in FIG. 11, the network control device 100 according to the embodiment of the present invention includes, as hardware, an external I/F 301, a RAM (Random Access Memory) 302, a ROM (Read Only Memory) 303, a processor 304, a communication I/F 305, and an auxiliary storage device 306. These hardware components are communicably connected via a bus B.

The external I/F 301 is an interface with the external device. A storage medium 301a or the like is an example of the external device. The network control device 100 can perform reading, writing, and the like of the storage medium 301a via the external I/F 301.

Examples of the storage medium 301a include a flexible disk, a CD (compact disc), a DVD (digital versatile disc), an SD memory card (secure digital memory card), or a USB (universal serial bus) memory card.

The RAM 302 is a volatile semiconductor memory that temporarily stores programs and data. The ROM 303 is a non-volatile semiconductor memory that can hold programs and data even if the power source is turned off. The ROM 303 stores, for example, setting information relating to an OS (operating system), setting information relating to a communication network, and the like.

The processor 304 is, for example, a CPU, a GPU (Graphics Processing Unit), or the like, and is a computation device for executing processing by reading out programs and data onto the RAM 302 from the ROM 303, the auxiliary storage device 306, or the like. The functional units (for example, the schedule management unit 101, the acquisition unit 102, the reallocation candidate narrowing unit 103, the allocation unit 106, the setting instruction unit 107, and the like) of the network control device 100 according to an embodiment of the present invention are realized through processing for causing the processor 304 to execute one or more programs stored in the auxiliary storage device 306 or the like. Note that these one or more programs may also be stored in, for example, the storage medium 301*a*.

The communication I/F 305 is an interface for connecting the network control device 100 to the physical network 200.

The auxiliary storage device 306 is, for example, an HDD (Hard Disk Drive), an SSD (Solid State Drive), or the like, and stores various types of programs and data. Examples of the programs and data stored in the auxiliary storage device 306 include an OS, application software for realizing various functions on the OS, and one or more programs for realizing various functional units of a network control device 100 according to an embodiment of the present invention.

The network control device 100 according to an embodiment of the present invention can realize the above-described various types of processing due to having the hardware configuration shown in FIG. 11. Note that in the example shown in FIG. 11, a case was shown in which the network control device 100 of an embodiment of the present invention is realized by one device (computer), but there is no limitation to this, and the network control device 100 may also be realized by multiple devices (computers). The one device (computer) may also include multiple processors 304 and multiple memories (RAM 302, ROM 303, auxiliary storage device 306, and the like). The network control device 100 may include, for example, a display device such as a display, and input devices such as a keyboard and a mouse in addition to the above-described hardware.

Second Embodiment

Next, the second embodiment of the present invention will be described. Since the present embodiment is different from the first embodiment only in the processing of the ranking unit 132, and the other components are similar in structure, the different processing will be described.

In the above-described embodiment, the network control device 100 ranks the nodes using the amount of change in the unit cost of electricity rates (see S201 and S202), but the present invention is not limited to this. For example, the ranking unit 132 may rank the nodes in consideration of information such as the centrality of the topology of the physical network, the resource availability of the physical server of each node, and the like, in addition to the amount of change in the unit cost of electricity rates. In this case, information indicating the topology of the physical network is stored in advance in the acquired information storage unit 110, and the ranking unit 132 refers to this information indicating the topology. The acquisition unit 102 periodically acquires information such as resource availability of the virtual server from each node.

In this way, when using the amount of change and the centrality, a method of ranking using the following indices is conceivable.

$$(\text{Index}) = (\text{Change amount})/(\text{Centrality})$$

Since "low centrality" is considered to be "located at the edge of a topology", it is assumed that the distance between the user terminal and the virtual server will be long. It is assumed that, using the index, the communication delay reduction effect can be obtained by moving virtual servers where the distance from the user terminal tends to become long to the center of the topology even for the allocation of the virtual servers while moving a virtual server of a node where the unit cost of electricity rates is increased to a place where the electricity rate is low.

[Supplementary Notes]

The present invention is not limited to the embodiments specifically disclosed above, and various modifications and changes can be made without departing from the scope of the claims.

That is, in the above-described embodiment, the unit cost of electricity rates is exemplified as the attached information of each node and each link, but the present invention is not limited thereto. For example, considering a situation in which each node is equipped with a photovoltaic power generation system, the present invention can be applied to realizing a virtual network which effectively utilizes renewable energy by selecting a virtual server which changes the arrangement while observing changes in the power generation amount.

REFERENCE SIGNS LIST

100 Network control device (example of control apparatus)
101 Schedule management unit
102 Acquisition unit (example of acquisition means)
103 Reallocation candidate narrowing unit (example of reallocation candidate narrowing means)
106 Allocation unit (example of allocation means)
107 Setting instruction unit
108 Model storage unit
109 Electricity rate-unit cost storage unit
110 Acquired information storage unit
131 Change amount calculation unit (example of change amount calculation means)
132 Ranking unit (example of ranking means)
133 Reallocation priority setting unit (example of reallocation priority setting means)
134 Reallocation candidate selection unit (example of reallocation candidate selection means)
200 Physical network
301 External I/F
301*a* Recording medium
302 RAM
303 ROM
304 Processor
305 Communication I/F
306 Auxiliary storage device

The invention claimed is:

1. A control apparatus configured to allocate virtual networks for providing network services to a physical network, the control apparatus comprising:
   circuity configured to:
      select, from virtual servers that are allocated to nodes, second virtual servers as candidates that are to be reallocated to the nodes, based on changes in a cost for the nodes that are included in the physical network, upon occurrence of a condition in which the virtual networks are allocated to the physical network,
      determine the changes in the cost for the nodes,
      rank the nodes based at least on a descending order of the changes in the cost for the nodes,
      set priorities associated with reallocation of the virtual servers allocated to the nodes, based on the ranked nodes, select one or more of the second virtual servers as candidates to be reallocated to given nodes, in descending order of the set priorities, and allocate a second virtual network including a specific virtual server to the physical network based on information related to the physical network.

2. The control apparatus according to claim 1, wherein the circuitry is configured to select, from the virtual servers, a predetermined number or a predetermined percentage of the second virtual servers.

3. The control apparatus according to claim 1, wherein the circuitry is configured to allocate a second virtual network of the virtual networks to the physical network, based on information related to the physical network, the second virtual network including a specific virtual server among the second virtual servers.

4. The control apparatus according to claim 3, wherein the circuitry is configured to select, from the virtual servers, a predetermined number or a predetermined percentage of the second virtual servers.

5. A control method executed by a control apparatus that allocates virtual networks for providing network services to a physical network, the control method comprising:

selecting, from virtual servers that are allocated to nodes, second virtual servers as candidates that are to be reallocated to the nodes, based on changes in a cost for the nodes that are included in the physical network, upon occurrence of a condition in which the virtual networks are allocated to the physical network, determining the changes in the cost for the nodes, ranking the nodes in descending order of the changes in the cost for the nodes, setting priorities associated with reallocation of the virtual servers allocated to the nodes, based on the ranked nodes, selecting one or more of the second virtual servers as candidates to be reallocated to given nodes, in descending order of the set priorities, and allocating a second virtual network including a specific virtual server to the physical network based on information related to the physical network.

6. A non-transitory computer readable medium storing a program which causes a computer to execute the control method of claim 5.

7. A control apparatus configured to allocate virtual networks for providing network services to a physical network, the control apparatus comprising:

circuity configured to:

select, from virtual servers that are allocated to nodes, second virtual servers as candidates that are to be reallocated to the nodes, based on changes in a cost for the nodes that are included in the physical network, upon occurrence of a condition in which the virtual networks are allocated to the physical network, determine the changes in the cost for the nodes, rank the nodes in descending order of the changes in the cost for the nodes, set priorities associated with reallocation of the virtual servers allocated to the nodes, based on the ranked nodes, select one or more of the second virtual servers as candidates to be reallocated to given nodes, in descending order of the set priorities, and allocate a second virtual network including a specific virtual server to the physical network based on information related to the physical network, wherein the information related to the physical network includes at least one of information indicating an outside temperature of each node that is included in the physical network, physical resource information of the physical network, and information indicating a predicted traffic amount of the physical network.

* * * * *